United States Patent Office 3,746,765
Patented July 17, 1973

3,746,765
DIOXOCYCLOHEXANE CARBOXYLIC AND THIO-
CARBOXYLIC ACID ANILIDES
Heinrich Ruschig, Bad Soden, Taunus, Johann König,
Niederhofheim, Taunus, Walter Dittmar, Hofheim,
Taunus, Peter Klatt, Kelkheim, Taunus, and Dieter
Duwel, Hofheim, Taunus, Germany (all % Farbwerke
Hoechst AG, Frankfurt am Main, Germany)
No Drawing. Filed Aug. 5, 1971, Ser. No. 169,530
Claims priority, application Germany, Aug. 8, 1970,
P 20 39 466.5
Int. Cl. C07c 103/86, 153/05
U.S. Cl. 260—551 S                    7 Claims

ABSTRACT OF THE DISCLOSURE

A compound of Formula I

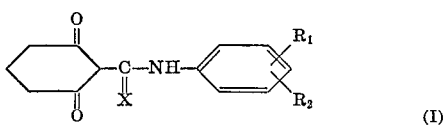

in which

X represents orygen or sulfur,
$R_1$ represents halogen, trifluoromethyl, nitro, alkyl of
1 to 4 carbon atoms, alkoxy of 1 to 4 carbon atoms or
halogen-alkoxy of 1 to 4 carbon atoms, or, if X stands
for sulfur, $R_1$ stands for hydrogen, and
$R_2$ represents hydrogen or the substituents given for $R_1$,
which compound has interesting chemotherapeutical
properties and is effective against intestinal worms as
helminths, especially against liver flukes. Because of
their antimycotic properties, the compounds of the in-
vention may also be used in human medicine and in
veterinary medicine to attack fungus infections.

---

The present invention relates to dioxocyclohexane car-
boxylic acid anilides and dioxocyclohexane thiocarboxylic
acid anilides and a process for their manufacture.

It is known to prepare 2,6-dioxocyclohexane carboxylic
acid anilides by the reaction of substituted and unsubsti-
tuted cyclohexane diones with phenyl isocyanate [cf.
Berichte 37, 4627 (1904), J. Chem. Soc. 1955, 346 and
Zhur. Obshchei Khim. 30, 542 (1960), cited according to
C. A. 54, 24575 (1960)]. It has, now, been found that
the reaction may also be extended to substituted phenyl
isocyanates and phenyl isothiocyanates, yielding com-
pounds of valuable pharmacological properties.

The present invention provides compounds of Formula I

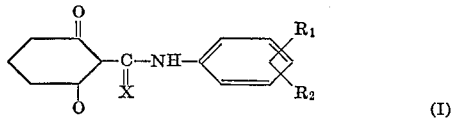

in which

X represents oxygen or sulfur,
$R_1$ represents halogen, trifluoromethyl, nitro alkyl of 1 to 4
carbon atoms, alkoxy of 1 to 4 carbon atoms or halogen-
alkoxy of 1 to 4 carbon atoms or, if X stands for sul-
fur, $R_1$ additionally stands for hydrogen and
$R_2$ represents hydrogen or the substituents given for $R_1$.

Among the compounds of Formula I those are pre-
ferred in which $R_1$ represents chlorine, bromine, iodine,
tri-fluoromethyl, nitro, methyl, ethyl, alkoxy of 1 to 4
carbon atoms or halogen-alkoxy of 1 to 3 carbon atoms
or, if X stands for sulfur, $R_1$ additionally stands for hy-
drogen and $R_2$ represents hydrogen, trifluoromethyl, chlo-
rine, bromine, methyl, ethyl, methoxy or ethoxy.

This invention also provides a process for the manu-
facture of the compounds of Formula I, which comprises
reacting cyclohexane-1,3-dione with a correspondingly sub-
situted phenyl isocyanate or phenyl isothiocyanate of the
Formula II

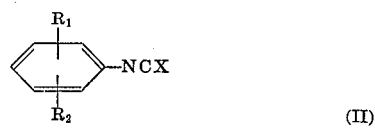

or with a corresponding agent capable of forming iso-
cyanates or isothiocyanates, advantageously in the pres-
ence of a base.

According to the invention, agents capable of forming
isocyanates or isothiocyanates are herein meant to be start-
ing substances which are converted in known manner into
the isocyanates or isothiocyanates under reaction condi-
tions (cf. Houben-Weyl, vol. 8, page 119; vol. 9, page
867). There may especially be mentioned correspondingly
substituted phenyl carbamic acid halides, phenyl carbamic
acid anhydrides, phenyl thiocarbamic acid halides, and
phenyl thiocarbamic acid anhydrides.

It is assumed that the reaction takes place in such a
manner that the corresponding urethane of Formula III is
formed at first, which can be rearranged by basic cata-
lysts to yield the anilides of Formula I (cf. Berichte 37,
4627 (1904)).

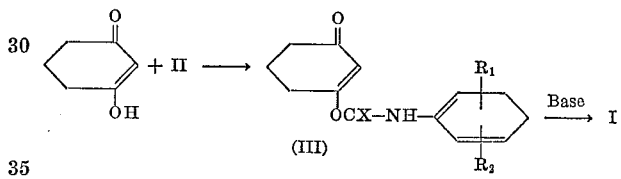

The reaction is advantageously carried out in solvents,
such as benzene, toluene, trichloromethane, tetrahydro-
furan, dimethylformamide, dioxan or sulfolan or in a
tertiary alcohol, such as tertiary butanol or tertiary amyl
alcohol. The base necessary for the rearrangement, for
example, triethylamine, potassium carbonate, sodium ace-
tate, pyridine, tripropylamine may be added immediately
or after a determined residence time. The reaction is
carried out within a wide temperature range, preferably
within the range of from 20° to 150° C.

After neutralization of the base with an acid the sol-
vent is evaporated and the residue is purified by recrystal-
lization.

The reaction products obtained have interesting chemo-
therapeutical properties. They are, among others, effec-
tive against intestinal worms as helminths, their activity
being pronounced against liver flukes and, among them,
especially against the big liver fluke Fasciola hepatica
which is an important parasite of domestic cattle, such
as sheep and beef. The products may be administered
orally or subcutaneously, the mode of administration
preferably used depending on the individual cases.

The products of the invention were tested on experi-
mentally infected sheep. 200 metacercariae of Fasciola
hepatica were orally administered to lambs; at the end of
a prepatence period the existence of an infection could
be ascertained by coprology.

The treatment effected was ascertained by repeated
control of faeces or by autopsy of sheep which had been
subjected to treatment.

The following Table 1 shows the effective dosage
(dosis effective), after administration of which at least
80% of the worms where eliminated and, in a further
column, the chemotherapeutical index which is the quo-
tient from $LD_{50}$ and the effective dosage. Thus, the higher
index number means that the corresponding active sub-
stance is superior to that having a lower index number.

TABLE 1

| Active substance: | Dosis effectiva | Chemo- therapeu- tical index Nos. |
|---|---|---|
| 2,6-dioxocyclohexane-thiocarboxylic acid-2',5'-dimethyl anilide | 50 | >16 |
| 2,6-dioxocyclohexane-thiocarboxylic acid-2'-methyl-4'-chloroanilide | 40 | >10 |
| 2,6-dioxocyclohexane-thiocarboxylic acid-3'-bromoanilide | 100 | >32 |
| 2,6-dioxocyclohexane-thiocarboxylic acid-4'-iodoanilide | 100 | >16 |
| 2,6-dioxocyclohexane-carboxylic acid-2'-chloroanilide | 80 | >10 |
| 2,6-dioxocyclohexane-thiocarboxylic acid-4'-chloroanilide | 50 | >30 |
| Known comparative substances: | | |
| "Niclofolan"=2,2'-dichloro-2,2'-dihydroxy-3,3'-dinitrobiphenyl | 4 | 2.8 |
| "Oxycloziauides"=3,3',5,5',6-pentachloro-2,2'-dihydroxy-benzene-anilide | 15 | ~5 |

Table 1 shows the superiority of the compounds of the invention as compared to the known active substances.

Because of their excellent antimycotic properties the compounds of the invention may also be used in human medicine and in veterinary medicine to attack fungus infections. There may be used solutions or preparations in powder form containing from 0.1 to 2% of active substance. Corresponding compositions, which are diluted before administration, may contain the active substance in considerably higher concentrations, i.e. up to 80 to 98% by weight.

The activity against cutaneous fungi appears to be particularly important. To examine the inhibitory effect in vitro Sabouraud's liquid nutrient medium was used.[1] The active compounds were diluted with the nutrient medium in such a manner that the concentrations of the compounds tested each time were within the range of from 125 to 0.25 micrograms per milliliter of medium. The germs were previously cultivated on a malt extract-dextrose-agar solution[2] and added to the test mixtures in such a manner that the following amounts of germs were obtained:

Cutaneous fungi and *Aspergillus niger*: $10^6$ spores per milliliter
*Candida albicans*: $10^5$ cells per milliliter The mixtures were maintained at 28° C. for 10 days and then evaluated.

The following Table 2 shows the in-vitro-activity of active Compounds A, B and C according to the invention against pathogenic fungi. The values obtained demonstrate that the efficiency of these compounds is very good.

Compound A: 2,6-dioxocyclohexane-carboxylic acid-4'-chloroanilide.

---
[1] Sabouraud's liquid medium (modif.):

|  | G. |
|---|---|
| Neopeptone (Difco) | 10 |
| Dextrose | 20 |

Distilled water on 1000 milliliters.
Addition N/1 NaOH up to pH 6.5.

[2] Malt-extract-dextrose-agar:

|  | G. |
|---|---|
| Peptone e carne (Merck 7214) | 10 |
| Malt extract "Malzextra" | 20 |
| Dextrose | 10 |
| Bacto-agar (Difco) | 18 |

Distilled water on 1000 milliliters.
Addition N/1 NaOH up to pH 6.5.

Compound B: 2,6-dioxocyclohexane-carboxylic acid-4'-bromoanilide.
Compound C: 2,6-dioxocyclohexane-thiocarboxylic acid-4'-chloroanilide.

TABLE 2

| Germs | Minimum fungistatic concentration in micrograms per milliliter | | |
|---|---|---|---|
| | A | B | C |
| Cutaneous fungi: | | | |
| *Trichophyton mentagrophytes* (strain 109) | 1-2 | 1-2 | 2-4 |
| *Microsporum canis* (strain 559) | 1-2 | 2 | 4 |
| Moulds: | | | |
| *Aspergillus niger* (strain 533) | 16 | 16-31 | 62 |
| Yeast-like organisms: | | | |
| *Candida albicans* (strain S 71) | 8 | 8 | 16 |
| *Candida albicans* (strain 504) | 8-16 | 16 | 31-62 |

To examine the antimycotic effect, cattle infected in natural manner with a cutaneous fungus, were treated. The treatment was effected with different cattle at different intervals of from 3 to 14 days each time, twice with a 1% solution of active Compounds B or C, active Compound B being dissolved in diethyl carbonate and active Compound C in water. To check the effect of the solvent one animal was treated with a corresponding amount of diethyl carbonate. The solutions of the active compounds were applied on the sickened section of the skin by means of a cotton swab. Compound B was tested on 6 bulls, Compound C on 10 bulls. In all cases the animals had been infected with a middle-grade to strong trichophytosis infestation which had been established in special cultures of the micro-organism. After only two applications each time of the 1% solution, all animals treated were completely cured within 20 to 25 days after the beginning of the treatment. In a following period of 6 weeks no recidivism appeared. Symptoms of incompatibiilty were not observed.

The appearance of disease of the untreated animals and of the animals treated with the solvent remained unchanged.

The toxicities of the compounds of the invention are very low. Thus, the acute toxicity of 2,6-dioxocyclohexanethiocarboxylic acid-4'-chloroanilide, determined as $LD_{50}$ on rats after subcutaneous injection was 964 milligrams per kilogram of body weight. After intravenous injection to rats the $LD_{50}$ was 229 milligrams per kilogram of body weight.

The following examples illustrate the invention:

EXAMPLE 1

2,6-dioxocyclohexane-carboxylic acid-4'-chloroanilide 459 grams of 4-chloro-phenyl-isocyanate in 250 milliliters of toluene were added dropwise to a mixture of 336 grams of cyclohexane-1,3-dione, 450 milliliters of toluene and 18 milliliters of triethylamine for 1 hour while stirring in such a manner that the temperature did not exceed 60° C. Stirring was continued for 2 hours at 60° C. Then 15 milliliters of glacial acetic acid were added, the toluene was evaporated under reduced pressure and the solid residue was recrystallized from ethanol. 670 grams (84%) of 2,6-dioxocyclohexane-carboxylic acid-4'-chloroanilide having a melting point of from 113° to 115° C. were obtained.

EXAMPLE 2

(a) 2,6-dioxocyclohexane-carboxylic acid-3'-5'-bis-trifluoromethyl anilide 55 grams of 3,5-bis-trifluoromethyl-phenyl-isocyanate (having a boiling point of from 78° to 80° C. under a pressure of 24 millimeters mercury) were added dropwise to a solution of 24 grams of cyclohexane-1,3-dione in 240 milliliters of trichloromethane while stirring in such a manner that the temperature did not exceed 45° C. Then, 1.3 milliliters of triethylamine were added, the mixture was refluxed for 2 hours, the solvent was evaporated and the residue was recrystallized from ethanol after the addition of 2 milliliters of glacial acetic acid. 52 grams (66%) of 2,6-dioxocyclohexane-carboxylic acid-3'-5'-bis-trifluoromethyl anilide having a melting point of 123° C. were obtained.

In an analogous manner there were obtained:

| No. | Name | Melting point (° C.) | Yield, percent |
|---|---|---|---|
| 2b | 2,6 - dioxocyclohexane - carboxylic acid - 3' - chloroanilide. | 132–135 | 72 |
| 2c | 2,6 - dioxocyclohexane - carboxylic acid - 3',4' - dichloroanilide. | 96–97 | 71 |
| 2d | 2,6 - dioxocyclohexane - carboxylic acid - 4' - bromoanilide. | 109–111 | 81 |
| 2e | 2,6 - dioxocyclohexane - carboxylic acid - 4' - iodine-anilide. | 128–129 | 76 |
| 2f | 2,6 - dioxocyclohexane - carboxylic acid - 4' - nitroanilide. | 235–236 | 74 |
| 2g | 2,6 - dioxocyclohexane - carboxylic acid - 4' - methyl-anilide. | 116–117 | 60 |
| 2h | 2,6 - dioxocyclohexane - carboxylic acid - 4' - methoxy-anilide. | 102–103 | 77 |
| 2i | 2,6 - dioxocyclohexane - carboxylic acid - 3' - 1'',1'',2'',2'' - tetrafluoroethoxy - anilide. | 97–98 | 78 |
| 2k | 2,6 - dioxocyclohexane - carboxylic acid - 3' - 1'',1'',2'' - trifluoro - 2'' - chloro - ethoxy-anilide. | 84–85 | 82 |
| 2l | 2,6 - dioxocyclohexane- carboxylic acid - 3' - (1'',1'' - difluoro - 2' - ,2'' - dichloro - ethoxy)-anilide. | 93–94 | 83 |
| 2m | 2,6- dioxocyclohexane - carboxylic acid - 3' - methyl-4'-(1'',1'' - difluoro - 2'',2'' - dichloro - ethoxy) - anilide. | 92–94 | 75 |
| 2n | 2,6- dioxocyclohexane - carboxylic caid - 3' - (1'',1'',2'',3'',3'',3'' - hexafluoro - propoxy) - anilide. | 87–88 | 71 |
| 2o | 2,6 - dioxocyclohexane - carboxylic acid - 2' - chloroanilide. | 116–118 | 76 |
| 2p | 2,6 - dioxocyclohexane - carboxylic acid - 2' - bromoanilide. | 111–113 | 67 |
| 2q | From 2 - iodine - phenyl - isocyanate (having a boiling point of 76° C. under a pressure of 0.1 millimeter mercury). 2,6 - dioxocyclohexane - carboxylic acid - 2' - iodine - anilide. | 84–86 | 75 |
| 2r | 2,6 - dioxocyclohexane - carboxylic acid - 2' - methoxy - anilide. | 125–126 | 60 |
| 2s | 2,6 - dioxycyclohexane - carboxylic acid - 3' - trifluoromethyl - anilide. | 102–103 | 76 |
| 2t | From 3 - chloro - 2 - methyl - phenyl - isocyanate (having a boiling point of from 117 to 119° C. under a pressure of 28 millimeters mercury). 2,6 - dioxycyclohexane - carboxylic acid - 3' - chloro - 2' - methyl - anilide. | 118–120 | 74 |
| 2u | 2,6 - dioxocyclohexane - carboxylic acid - 3' - chloro - 4' - methyl - anilide. | 108–109 | 72 |
| 2v | From 4 - chloro - 2 - methyl - phenyl - iso - cyanate (having a boiling point of from 113° to 116° C. under a pressure of 23 millimeters mercury). 2,6 - dioxocyclohexane - carboxylic acid - 4' - chloro - 2' - methyl - anilide. | 153–154 | 75 |
| 2w | 2,6 - dioxocyclohexane - carboxylic acid - 3' - chloro - 4' - methoxy- anilide. | 151–153 | 73 |
| 2x | From 2,5 - dimethyl - phenyl - isocyanate (having a boiling point of from 98 to 101° C. under a pressure of 20 millimeters mercury). 2,6 - dioxocyclohexane - carboxylic acid - 2'5' - dimethyl - anilide. | 129–130 | 70 |

In the case of starting substances which have not yet been described, their name and boiling point are indicated.

EXAMPLE 3

(a) 2,6-dioxocyclohexane-thiocarboxylic-acid-anilide 65 grams of potassium carbonate and 45 grams of cyclohexane-1,3-dione were successively introduced in 120 milliliters of dimethylformamide while stirring. Then 54 grams of phenyl isothiocyanate were added dropwise in such a manner that the internal temperature was maintained within the range of from 30 to 40° C. Stirring was continued for 2.5 hours, the reaction mixture was diluted with 1 liter of water and the whole was allowed to stand for 2 hours. The solution was filtered, acidified with concentrated hydrochloric acid, the precipitate was suction-filtered, washed with 120 milliliters of water and recrystallized from ethanol. 63 grams of 2,6-dioxocyclohexane-thiocarboxylic acid-anilide having a melting point of from 82 to 83° C. were obtained.

In an analogous manner, there were obtained:

| No. | Name | Melting point (° C.) | Yield, percent |
|---|---|---|---|
| 3b | 2,6-dioxocyclohexane-thiocarboxylic acid-2'-methyl-anilide. | 123–124 | 63 |
| 3c | 2,6-dioxocyclohexane-thiocarboxylic acid-4'-chloro-anilide. | 113–115 | 77 |
| 3d | 2,6-dioxocyclohexane-thiocarboxylic acid-4'-bromo-anilide. | 105–106 | 75 |
| 3e | 2,6-dioxocyclohexane-thiocarboxylic acid-4'-n-butoxy-anilide. | 83–84 | 65 |
| 3f | 2,6-dioxocyclohexane-thiocarboxylic acid-4'-isobutoxy-anilide. | 82–83 | 72 |

EXAMPLE 4

2,6-dioxocyclohexane-carboxylic acid-4'-chloroanilide 10 grams of 4 - chlorophenyl-carbamic acid-acetic-acid anhydride, 5.5 grams of cyclohexane-1,3-dione and 60 milliliters of benzene were mixed, 3 milliliters of triethylamine were added and the mixture was heated at 80° C. for 20 minutes. The turbid solution was filtered and evaporated under reduced pressure; the residue was recrystallized twice from ethanol after the addition of 3 milliliters of glacial acetic acid. 6.2 grams (49%) of 2,6 - dioxocyclohexane-carboxylic acid - 4'-chloroanilide having a melting point of 114° C. were obtained.

EXAMPLE 5

2,6-dioxocyclohexane-carboxylic acid-4'-chloroanilide 12.4 grams of 4-chlorophenyl-carbamic acid-chloride, 7.5 grams of cyclohexane-1,3-dione and 50 milliliters of benzene were mixed while stirring. 10 milliliters of triethylamine were added within 10 minutes and the mixture was heated to 80° C. for 30 minutes. The solvent was evaporated under reduced pressure, 5 milliliters of glacial acetic acid were added to the residue and the product was recrystallized from ethanol. 7.1 grams (41%) of 2,6 - dioxocyclohexane-carboxylic acid - 4'-chloroanilide having a melting point of from 114 to 115° C. were obtained.

EXAMPLE 6

(a) 2,6-dioxocyclohexane-thiocarboxylic acid-3'-methyl-anilide 28 milliliters of water, 92 grams of potassium carbonate and 70 grams of cyclohexane - 1,3 - dione were successively added to 285 milliliters of tertiary butanol while stirring. The mixture was heated to 80° C. and 85 grams of 3-methyl-phenyl-isothiocyanate were added dropwise within 15 minutes. Stirring was continued at 80° C. for 1 hour, the reaction mixture was poured in 2.7 liters of water and the whole was allowed to stand for 2 hours. The solution was filtered, acidified with concentrated hydrochloric acid. The precipitate was suction-filtered, washed with 200 milliliters of water and recrystallized from ethanol. 105 grams (70%) of 2,6-dioxocyclohexane-thiocarboxylic-acid-3' - methyl-anilide having a melting point of 97° C. were obtained.

In an analogous manner, there were obtained:

| No. | Name | Melting point (°C.) | Yield, percent |
|---|---|---|---|
| 6b | 2,6-dioxocyclohexane-thiocarboxylic acid-2',5'-dimethyl-anilide. | 86-87 | 66 |
| 6c | 2,6-dioxocyclohexane-thiocarboxylic acid-2'-chloroanilide. | 91-92 | 75 |
| 6d | 2,6-dioxocyclohexane-thiocarboxylic acid-3'-chloroanilide. | 114-115 | 72 |
| 6e | 2,6-dioxocyclohexane-thiocarboxylic acid-3'-bromoanilide. | 123-124 | 65 |
| 6f | 2,6-dioxocyclohexane-thiocarboxylic acid-2'-iodine-anilide. | 123-124 | 70 |
| 6g | 2,6-dioxocyclohexane-thiocarboxylic acid-4'-iodine-anilide. | 106-107 | 71 |
| 6h | 2,6-dioxocyclohexane-thiocarboxylic acid-3'-4'-dichloroanilide. | 142-143 | 73 |
| 6i | From 3,5-bis-trifluoro-methyl-phenyl-isothiocyanate (having a boiling point of from 98-100° C. under a pressure of 22 millimeters mercury). 2,6-dioxocyclohexane-thiocarboxylic-acid-3',5'-bis-trifluoromethyl-anilide. | 75 | 65 |
| 6k | 2,6 - dioxocyclohexane - thiocarboxylic - acid - 4'-chloro-2'-methyl-anilide. | 126-128 | 70 |
| 6l | 2,6 - dioxocyclohexane - thiocarboxylic - acid - 4'-methoxy-anilide. | 84-85 | 66 |
| 6m | From 3-ethoxy-phenyl-isothiocyanate (having a boiling point of from 137-138° C. under a pressure of 10 millimeters mercury). 2,6-dioxocyclohexane-thiocarboxylic acid-3'-ethoxy-anilide. | 82-84 | 60 |
| 6n | 2,6-dioxocyclohexane-thiocarboxylic acid-4'-nitroanilide. | 188-189 | 74 |

We claim:
1. A compound of Formula I

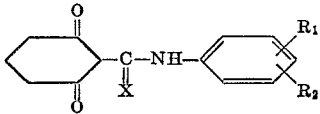

(I)

in which

X represents oxygen or sulfur, $R_1$ represents halogen, trifluoromethyl, nitro, alkyl of 1 to 4 carbon atoms, alkoxy of 1 to 4 carbon atoms or halogen-alkoxy of 1 to 4 carbon atoms or, if X stands for sulfur, $R_1$ stands for hydrogen, and $R_2$ represents hydrogen or the substituents given for $R_1$.

2. 2,6 - dioxocyclohexane-carboxylic-acid - 4'-chloroanilide.

3. 2,6 - dioxocyclohexane-carboxylic-acid-3',5' - bis-trifluoro-methyl-anilide.

4. 2,6 - dioxocyclohexane-carboxylic-acid - 4' - bromoanilide.

5. 2,6-dioxocyclohexane-thiocarboxylic-acid-anilide.

6. 2,6 - dioxocyclohexane-thiocarboxylic-acid - 4'-chloroanilide.

7. 2,6 - dioxocyclohexane-thiocarboxylic-acid - 4'-bromoanilide.

References Cited

Dieckmann et al.: Ber., vol. 37, p. 4627–38 (1904).
Goerdeler et al.: Ber., vol. 97, p. 2209–17 (1969).

HARRY I. MOATZ, Primary Examiner

U.S. Cl. X.R.

260—470, 471 C, 557 R; 424—324

UNITED STATES PATENT OFFICE
CERTIFICATE OF CORRECTION

Patent No. 3,746,765        Dated July 17, 1973

Inventor(s) Ruschig et al.

It is certified that error appears in the above-identified patent and that said Letters Patent are hereby corrected as shown below:

In the Heading:

After "Main, Germany)" insert --, assignors to Farbwerke Hoechst Aktiengesellschaft vormals Meister Lucius & Bruning of Frankfurt (Main), Germany.--

Signed and sealed this 15th day of January 1974.

(SEAL)
Attest:

EDWARD M. FLETCHER, JR.            RENE D. TEGTMEYER
Attesting Officer                  Acting Commissioner of Patents